(12) United States Patent
Van Elburg et al.

(10) Patent No.: US 8,606,738 B2
(45) Date of Patent: Dec. 10, 2013

(54) POLICY-BASED MANAGEMENT IN COMMUNICATION NETWORK

(75) Inventors: Johannes Van Elburg, Oosterhout (NL); Paulus Karremans, Tilburg (NL); Hendrikus Adrianus Antonia Maria van der Velden, Eindhoven (NL); Eltjo Boersma, Eindhoven (NL)

(73) Assignee: Telefonaktiebolaget L M Ericcson (publ), Stockholm (SE)

( * ) Notice: Subject to any disclaimer, the term of this patent is extended or adjusted under 35 U.S.C. 154(b) by 720 days.

(21) Appl. No.: 11/910,933

(22) PCT Filed: Apr. 8, 2005

(86) PCT No.: PCT/EP2005/003863
§ 371 (c)(1), (2), (4) Date: Sep. 4, 2008

(87) PCT Pub. No.: WO2006/108436
PCT Pub. Date: Oct. 19, 2006

(65) Prior Publication Data
US 2009/0287627 A1  Nov. 19, 2009

(51) Int. Cl.
*G06F 17/00* (2006.01)
*G06N 5/02* (2006.01)

(52) U.S. Cl.
USPC ............................................. 706/47; 709/232

(58) Field of Classification Search
None
See application file for complete search history.

(56) References Cited

U.S. PATENT DOCUMENTS

| 6,301,613 B1 | 10/2001 | Ahlstrom et al. |
| 2004/0064575 A1 | 4/2004 | Rasheed et al. |

FOREIGN PATENT DOCUMENTS

| WO | WO 03/012670 A | 2/2003 |
| WO | WO 03/085901 A | 10/2003 |

*Primary Examiner* — Luis Sitiriche (57) ABSTRACT

A method and system for policy based management in a communication system, comprising at a policy enforcement point (101) associated with policy decision points (102,103, 104). The enforcement point (101) transmits a request for a decision from the decision points (102,103,104). A policy strategy point (105) is configured with a decision strategy, comprising an algorithm for determining a resulting decision. The decision points (102,103,104) generate decisions upon which the strategy point (105) generates the resulting decision, by applying said decision strategy on said decisions. The strategy point (105) communicates the resulting decision to the enforcement point (101), which executes the resulting decision.

21 Claims, 7 Drawing Sheets

POLICY-BASED MANAGEMENT IN COMMUNICATION NETWORK

BACKGROUND OF THE INVENTION

1. Technical Field of the Invention

The present invention relates to a method and system for policy based management in a communication system, comprising a policy enforcement point associated with a plurality of policy decision points, wherein the enforcement point transmits a request for a decision from the decision points.

2. Description of Related Art

In an open services market, operators of communications networks such as telecommunication networks or data networks wish to provide highly secure, open, standard interfaces to their networks.

Policy-based management of a network is a recent approach to meet these requirements by distribution of functionality among network components and by simplifying the linking of the distributed functionality to one another by employing policies. In the service layer, policies may govern if, when and how much to charge, whether identities should be anonymised, etc. The term 'policy-based management' in this patent specification should expansively be construed to cover any kind of control of communications network functionality based on policies. It includes also the control and evaluation of policies, policy decisions and policy enforcement in a communications network.

A policy is a statement that dictates what behaviours are appropriate and under which conditions. A network administrator may define a set of policies governing the network. A policy consists of 'policy logic' (i.e. the rules/logic to be evaluated) and 'policy data, comprising parameters in this policy logic that may be given specific values. A policy may be expressed in many ways including a script composed of conditions and actions. The conditions are to be evaluated. The condition/action expression is not the only way of expressing a policy. Other examples of how a policy may be expressed are:
 the Privacy Preferences Expression Language. Using this language, a user can express her preferences in a set of preference-rules, which can then be used by her user agent to make automated or semi-automated decisions regarding the acceptability of machine-readable privacy policies from P3P enabled Web sites. (P3p stands for "The Platform for Privacy Preferences Project", developed by the World Wide Web Consortium, is an industry standard which provides a simple, automated way for users to gain more control over the use of personal information on Web sites the users visit).
 Parlay/OSA Policy Management policy. Parlay integrates telecom network capabilities with IT applications via a secure, measured, and billable interface. OSA stands for Open Services Architecture;
 Parlay/OSA service level agreement;
 Extensible Access Control Markup Language (XACML), XACML defines a general policy language used to protect resources as well as an access decision language.

Policy-based management provides a way to allocate network resources, primarily network bandwidth, quality of service (QoS), and security (such as firewalls), according to defined business policies. The increase of the importance of policy-based management is evident in for example the increasing requirements for QoS with the use of Voice over IP (VoIP) and other real-time applications. Because of these type of applications, the requirement for bandwidth allocation based on policy increases.

Policies comprise rules for e.g.:
 Access to resources on the network;
 High priority traffic;
 Low priority traffic;
 Traffic with guaranteed delivery;
 Bandwidth allocation to ensure guaranteed delivery.

Recent trends show that the concept 'policies' appears more and more in the context of standardization and is increasingly being referred to by customers. Examples of standardization bodies are Open Mobile Alliance (OMA), Liberty Alliance, Web Services in general, Parlay/OSA, Internet Engineering Task Force (IETF), and Organization for the Advancement of Structured Information Standards (OASIS).

A policy-based management system allows administrators to define policy rules and manage them in the policy system. These rules may take the form 'If condition, then action.' A condition may be a user or group, the time of day, the application type, or the network address. Policy rules are then distributed to network resources. Policy-based management systems are best for large networks where large numbers of devices are easier to manage from a central location. Public networks will also use a form of policy management to allocate resources, but resource allocation is based on SLAs (services level agreements) established with customers. Resources include devices that manage network bandwidth, security, IP addresses, storage, processors, and agents, as well as systems that manage services such as billing and accounting.

In a communications network there are several places where policies are used. The Policy Framework (POLICY) Working Group of the Internet Engineering Task Force (IETF) has developed a policy management architecture that is considered the best approach for policy management on the Internet. It includes the following components:
 Policy Management Service: A graphical user interface for specifying, editing, and administering policy;
 Dedicated Policy Repository: A place to store and retrieve policy information, such as a Directory Enabled Network (DEN) device or an LDAP server (LDAP meaning 'Lightweight Directory Access Protocol', a protocol that applications use to access the directory);
 Policy Decision Point (PDP): A resource manager or policy server that is responsible for handling events and making decisions based on those events (i.e., at time x do y);
 Policy Enforcement Point (PEP): A PEP exists in network nodes such as routers, firewalls, and hosts. It enforces the policies (i.e. carry out an action) based on the decision it has received from the PDP;
 Local Policy Decision Point (LPDP): This is a co-located PDP that exists within a PEP e.g. within a network node.

A variety of protocols may be used to communicate policy information between the PDP and the PEP. Common Open Policy Service (COPS) is the usual protocol between a PEP and a PDP, where the PEP requests a decision from the PDP. COPS is a client/server protocol that provides transport services for moving policy information among IP network nodes. It also provides the transport for policy queries and responses. By moving policy information to different subnets, users can log on at other locations and receive the same service they receive from their home network. Also other protocols may be used like DIAMETER, which is a protocol for authentication, authorization and accounting) or Simple Network Management Protocol (SNMP), which is an Internet standard protocol for network management software.

A typical policy transaction starts with a resource request to some device by a user or another network device. For example, a user may request access to a router interface that leads to the Internet. The router forwards the request to the PDP in the policy server using the COPS protocol. The policy server then queries one or more directory servers to determine the user's authorization. The information is then used to build a "policy lease" that is sent back to the router. The router then implements and enforces the policy via its policy enforcement point.

In the prior art, PEPs are mostly associated with just one PDP. Typically, a PDP supports one or more commonly known configuration protocols, such as COPS. For top-down provisioning, a PDP may use COPS-Provisioning (COPS-PR) to push top-down configuration information to associated PEPs. COPS-PR is an extension to COPS where the PDP contacts a PEP. COPS-PR has been designed within a framework that is optimized for efficiently provisioning policies across devices. First, COPS-PR allows for efficient transport of attributes, large atomic transactions of data, and efficient and flexible error reporting. Second, as it has a single connection between a PEP and PDP per area of policy control identified by a COPS Client-Type, it guarantees only one PDP updates a particular policy configuration at any given time.

Systems according to the prior art comprise a PEP sending out a decision request to a PDP when a specific Event occurs at the entity implementing the PEP. The PEP sends information about the Event or a pointer/reference to such information to the PDP. The PDP evaluates the Event against the policy relevant to the event and decides the appropriate policy enforcement. Subsequently the PDP returns its decision on how the PEP must act on the Event to the PEP and the PEP carries out (enforces) the decision generated by the PDP.

Especially in the service layer area there may occur the problem that multiple policy decision points may be involved and communicate their decisions to one PEP, which may lead to multiple conflicting decisions from the PEP's point of view. For example, the privacy settings of the user (actor) may be represented as one set of policies and the business rules derived by the operator/service provider (actor) as a different set of policies. Each set of policies may be evaluated by a dedicated own PDP. The result of evaluations of both sets of policies needs to be taken into account when providing the service to the user. Typically there are two known solutions to this problem.

The first known solution is a PEP requesting actions from only one PDP. This means that this PDP contains the combined rules of the different actors/roles. This may be realized but puts a high burden on the management side of the central PDP. The problem with this solution is that this becomes quite complex. For example because permission for reading-, writing-, and/or execution management actions on policies may differ per actor.

The second known solution is a PEP consulting multiple PDPs, and combining the results in a preconfigured or hard coded way. Hard-coded features are built into the hardware or software in such a way that they cannot be easily modified. For example the privacy preferences always overrule the business rules. The problem with this solution is that the PEP has to be actively aware of the different PDPs and their priorities in a relatively inflexible way.

SUMMARY OF THE INVENTION

The invention deals with the aforementioned problem by providing a method and a system for enforcing a decision by a Policy Enforcement Point (PEP) based on decisions of multiple Policy Decision Points (PDPs).

In a first aspect of the invention a method is provided for policy based management in a communication system, comprising a policy enforcement point associated with a plurality of policy decision points, wherein the enforcement point transmits a request for a decision from the decision points, characterized by the steps of:
  configuring a policy strategy point with a decision strategy, comprising an algorithm for determining a resulting decision;
  the decision points generating decisions;
  the strategy point generating the resulting decision, by applying said decision strategy on said decisions;
  the strategy point communicating the resulting decision to the enforcement point;
  the enforcement point executing the resulting decision.

By using this method, each of the roles involved in the handling of the request may make its own set of rules. For example, the business rules are created by the business manager; privacy rules (or privacy profile) are created by the end-user and/or the subscriber; barring rules may be defined by the subscriber and/or the end-user. Stakeholders have freedom to manage and provision the various PDPs throughout the network in their own way, and they may at the same time rely on a common policy strategy point, which ensures unambiguous decisions for the policy enforcement point to enforce. Thus, by configuring a policy strategy point in a flexible way, combining the decisions of different policy decision points into one decision that is to be enforced, becomes more flexible. Consequently, a lot of flexibility is provided to e.g. an operator of a communication network.

An embodiment of the method as described in the first aspect of the invention comprises a method, which further comprises the step of configuring an orchestration strategy to be applied by the strategy point for acquiring decisions of the decision points.

A further embodiment comprises a method, wherein said algorithm comprises an algorithm of the group including:
  the decision that is generated by a majority of the decision points;
  the decision that is generated by a weighted majority of the decision points;
  the decision that has been assigned with the highest weight;
  the decision generated by a decision point having the highest priority according to a priority scheme, wherein each of the decision points has a priority assigned;
  the decision that is generated by a first decision point of the decision points having put a veto on a decision of at least one other decision point of the decision points;
  the decision that is, based on statistics, generated most frequently by the decision points.
  the first decision that is generated by a decision point;
  the decision of a further decision point, which is requested by the strategy point, if applying a decision strategy on the available decisions of multiple decision points does not result in a conclusive decision.

A further embodiment comprises a method, having a hierarchy in selecting an algorithm.

A further embodiment comprises a method, wherein the step of configuring a decision strategy comprises selecting a decision strategy out of a set of decision strategies.

A further embodiment comprises a method, wherein the step of configuring a decision strategy comprises combining strategy elements out of a set of strategy elements into a decision strategy.

A further embodiment comprises a method, wherein the resulting decision is conclusive, if the generated decisions of the decision points are at least partially conflicting with respect to each other.

A further embodiment comprises a method, wherein the decision strategy is configured, based on the characteristics of said decisions.

A further embodiment comprises a method, wherein the step of the enforcement point transmitting a request for a decision, comprises directing said request to the strategy point.

A further embodiment comprises a method, wherein the step of the enforcement point transmitting a request for a decision, comprises directing said request to the decision points, and further comprising the steps of the decision points directing said request to the strategy point.

A further embodiment comprises a method, wherein the step of transmitting a request for a decision is in parallel or in sequence.

A further embodiment comprises a method, wherein the orchestration strategy is retrieved from a decision point.

A further embodiment comprises a method, wherein the orchestration strategy is configured in such way that acquiring decisions of additional decision points is based on the already acquired decisions.

A further embodiment comprises a method, wherein the strategy point requests and receives a policy from a Policy Repository.

In a second aspect of the invention a system is provided for policy based management in a communication system, comprising a policy enforcement point associated with a plurality of policy decision points, arranged for generating decisions; the enforcement point arranged to transmit a request for a decision from the decision points and for executing a resulting decision, characterized in that the system further comprises:
- a policy strategy point configured with a decision strategy, comprising an algorithm for determining the resulting decision;
- the strategy point arranged for generating the resulting decision, by applying said decision strategy on said decisions;
- the strategy point arranged for communicating the resulting decision to the enforcement point.

An embodiment of the system as described in the second aspect of the invention comprises a system, wherein the strategy point is interoperably connected to at least one of the decision points.

A further embodiment comprises a system, wherein the strategy point is interoperably connected to the enforcement point.

A further embodiment comprises a system, wherein the strategy point is interoperably connected to the enforcement point and to at least one of the decision points.

A further embodiment comprises a system, which further comprises a policy repository arranged for providing a policy to the strategy point, said policy being relevant for a specific PEP, multiple PEPs, a specific PDP and/or multiple PDPS.

A further embodiment comprises a system, wherein the policy repository is arranged for providing a policy to the strategy point, said policy being relevant to the event upon which said policy is requested by the strategy point.

A further embodiment comprises a system, wherein the policy repository is interoperably connected to the strategy point.

DETAILED DESCRIPTION OF THE DRAWINGS

The FIGS. 1 and 2 show prior art solutions.

FIG. 1 shows a prior art situation in case of an application service provider requesting a service to be provided by a service provider to a customer. A PEP 101 requests and receives at 201,202,203 a decision by multiple PDPs 102,103, 104. Example policies of these PDPs are policies relating to regulation, legislation, user preferences/end-user settings, privacy, business to business service profile, charging, white list/black list etc. The PEP 101 has a hard-coded program, which enables the PEP to decide conclusively if it receives conflicting decisions of the PDPs 102,103, or 104. The conclusive decision may be enforced by the PEP to a service provider (not shown).

The invention will now be described by way of examples as illustrated by figures.

Figure 1:
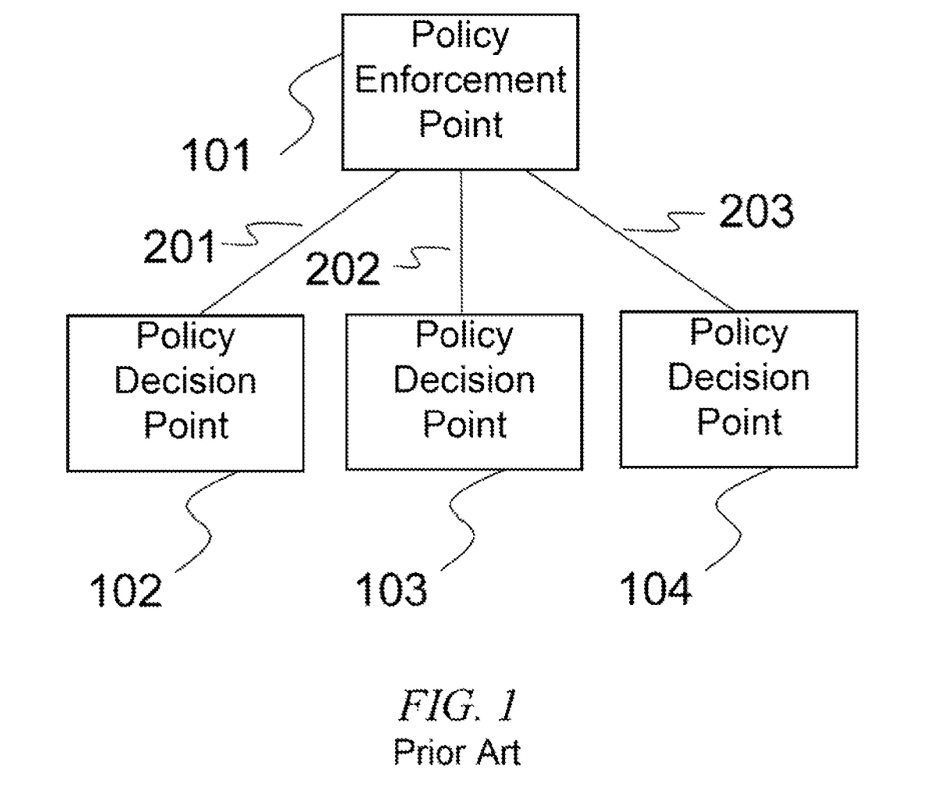
Figure 2:
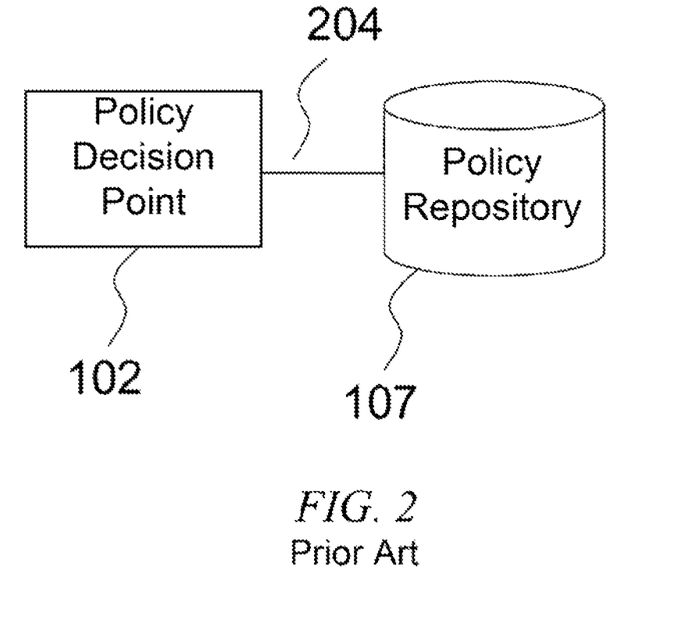
FIG. 2 shows a prior art situation, wherein a PDP 102 may request and receive 204 a policy from a Policy Repository (PR) 107. The Policy Repository may hold multiple policies for a specific PEP, multiple PEPs, a specific PDP or multiple PDPs. The PR 107 may provide a policy to the PDP 102, which policy is relevant to the event upon which the policy is requested by the PDP 102. The PR 107 may be co-located at the PDP 102.
Figure 3:
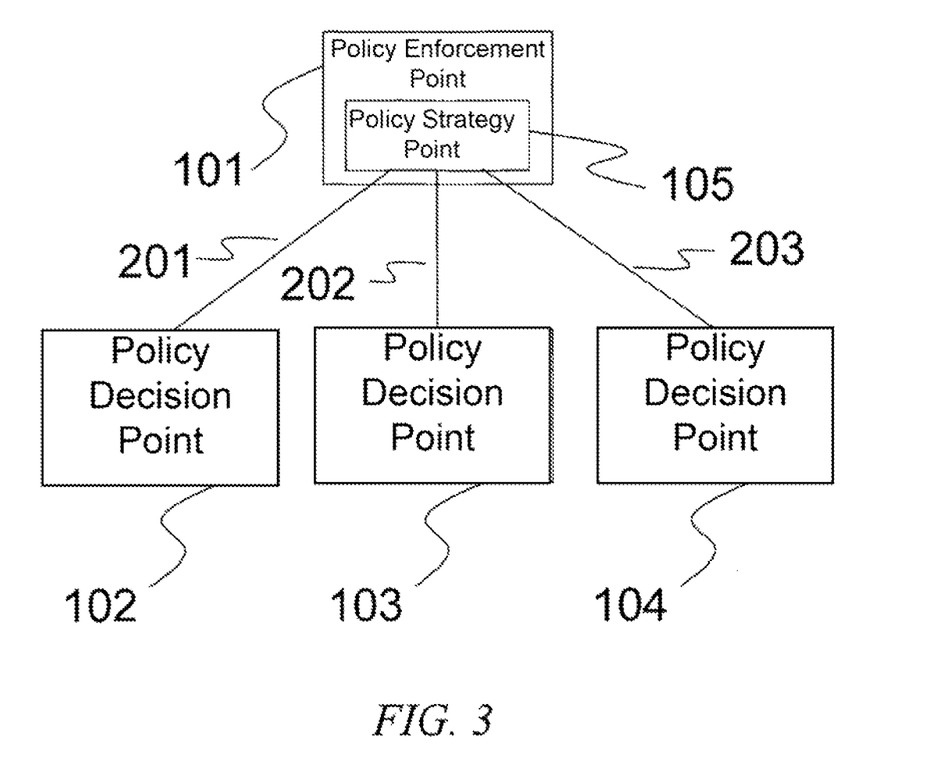
FIG. 3 shows an embodiment of the invention wherein a single Policy Enforcement Point (PEP) 101 requests and receives 201,202,203, through a (e.g. co-located) Policy Strategy Point (PSP) 105, decisions from a plurality of Policy Decision Points (PDPs) 102,103,104. The requesting and/or receiving 201,202,203 may be parallel or in sequence. The PSP 105 enables the PEP 101 to decide conclusively—by applying a decision strategy—, if it receives conflicting decisions of the PDPs 102,103, or 104 and to resolve said conflicts.
Figure 4:
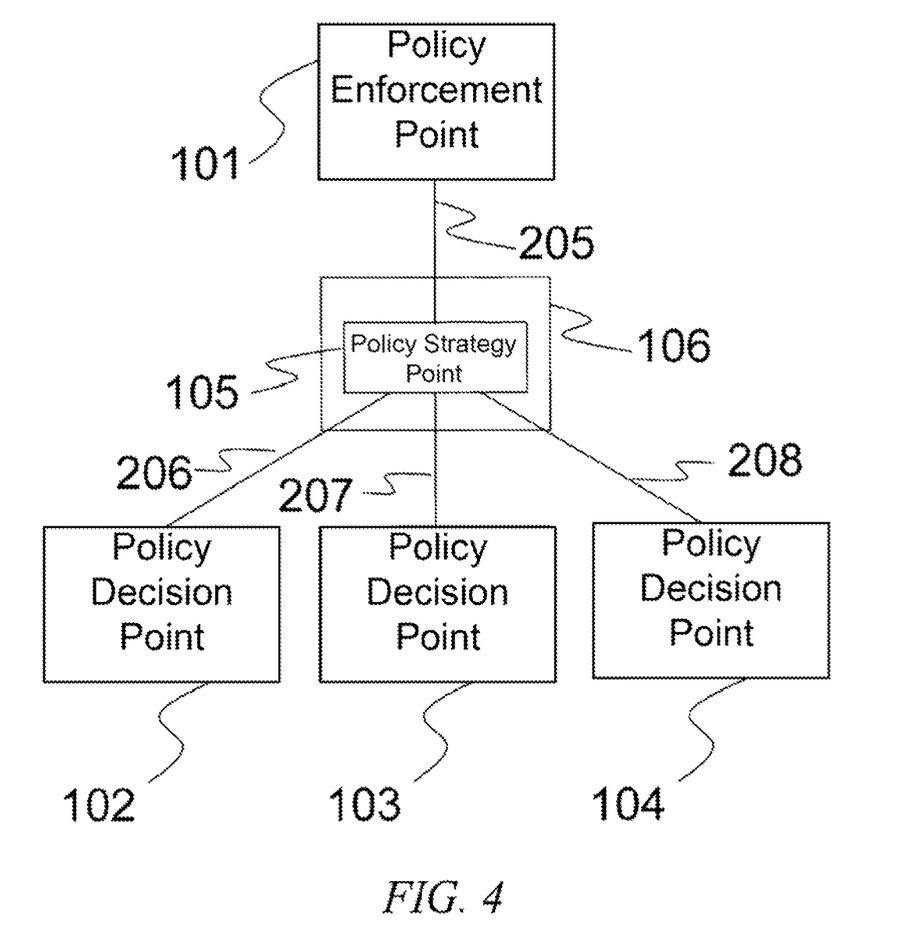
FIG. 4 shows an embodiment of the invention wherein a single PEP 101 requests and receives 205 through a PSP 105, one or more decisions from PDPs 102,103 and 104. The PSP 105 directs the requests of PEP 101 to PDPs 102, 103, and 104. The PSP 105 evaluates and coordinates the decisions of PDPs 102, 103 and 104 to resolve conflicts. This results in a resulting decision. The PSP 105 sends the resulting decision to PEP 101. The PSP 105 in this case is not co-located to any specific PDP. The PSP may be co-located to any network node 106. Optionally the PSP may be a point that orchestrates a workflow i.e. a certain sequence of events such as a sequence of requesting PDPs 102,103,104 for decisions. In the latter case the sequence of requesting the PDPs 102,103,104 may determine the priority order. In case of conflicting decisions, the PDP that is requested for a decision earlier may for example have priority over a latter PDP. The PSP 105 may also request further PDPs for a decision if there is a stalemate in decisions. The further requested PDP may provide the conclusive decision.
Figure 5:
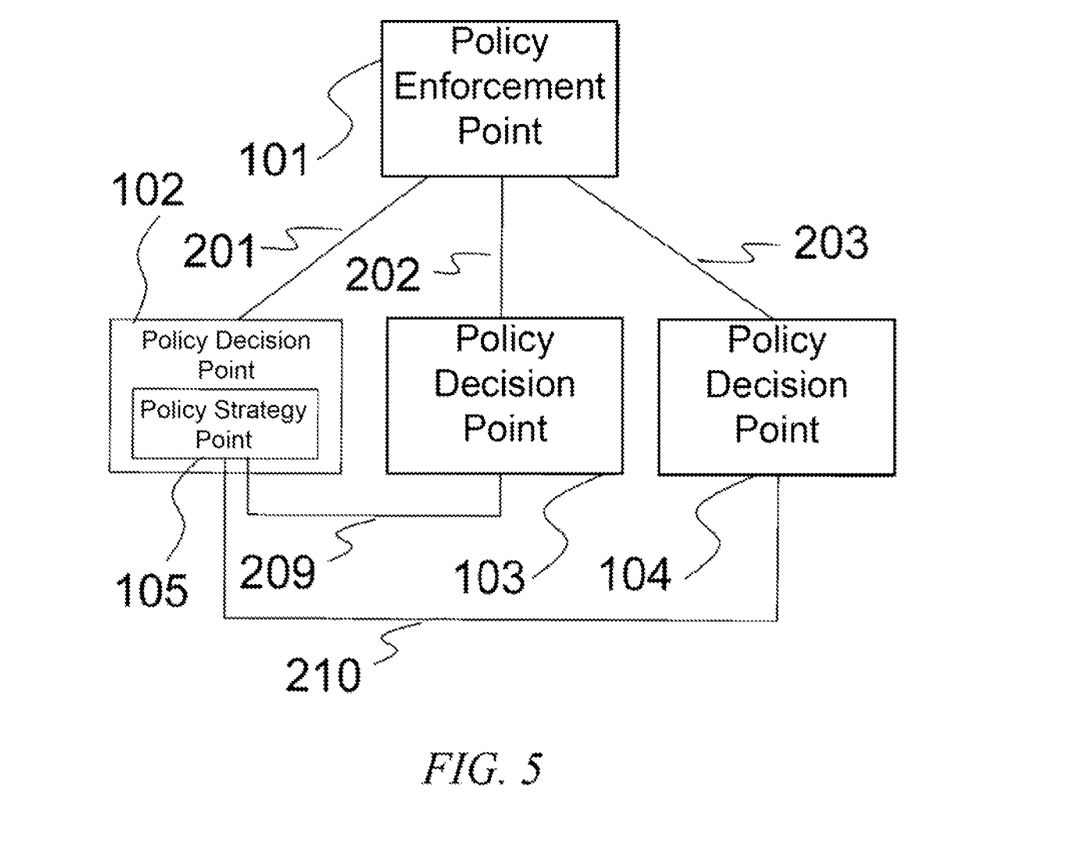
FIG. 5 shows an embodiment of the invention wherein a single PEP 101 requests and receives 201,202,203, decisions from PDPs 102,103 and 104. PDPs 103,104 send 209, 210, decisions to be evaluated and coordinated by the PSP 105, which is e.g. co-located at the PDP 102. The PSP 105 evaluates and coordinates decisions of PDPs 102,103,104 to rule out conflicting decisions. PDPs 102,103, and/or 104 send 201,202,203 coordinated decisions to PEP 101.
Figure 6:
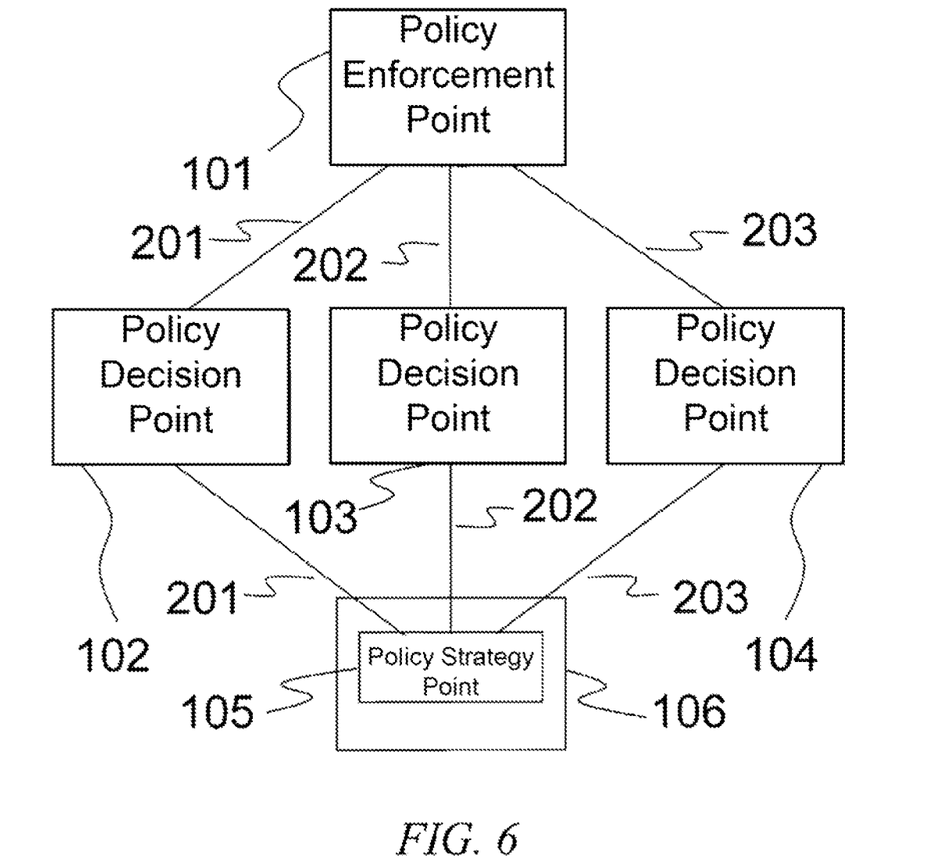
FIG. 6 shows an embodiment of the invention wherein a single PEP 101 requests and receives 201, 202, 203, decisions from PDPs 102,103 and 104. PDPs 102,103,104 direct the request of PEP 101 to a common PSP 105, which evaluates and coordinates the decisions of PDPs 102, 103 and 104 to rule out conflicting decisions. The PDPs 102,103, or 104 send coordinated decisions to the PEP 101. The PSP 105 in this case is not co-located at any PDP involved in the decision process. The PSP may be co-located at any network node 106.
Figure 7:
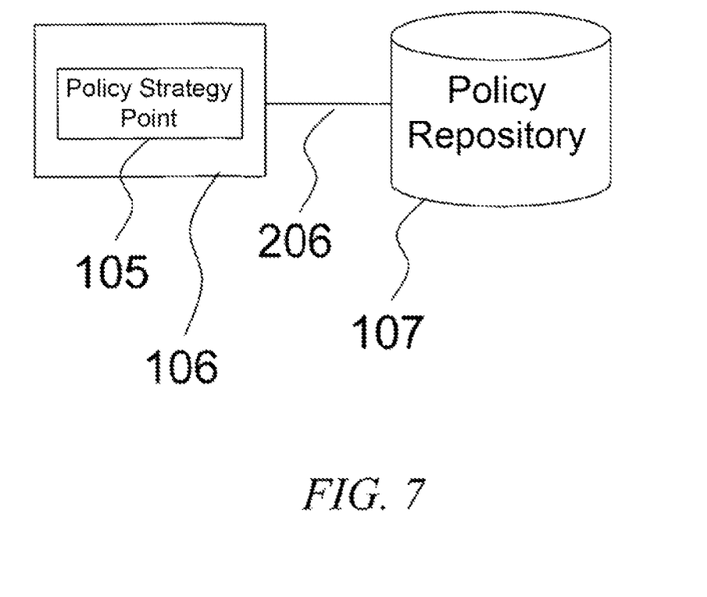
FIG. 7 shows an embodiment of the invention, wherein the PSP 105 may request and receive 206, a policy from a Policy Repository (PR) 107. The Policy Repository may hold multiple policies for a specific PEP, multiple PEPs, a specific PDP or multiple PDPs. The Policy Repository may provide a policy to the PSP 105, which policy is relevant to the event upon which the policy is requested by the PSP 105. The PSP 105 may be co-located at any network node 106. The Policy Repository (PR) 107 may be co-located at the PSP 105.

What is claimed is:

1. A method for policy based management in a communication system, comprising a policy enforcement point associated with a plurality of policy decision points, wherein the policy enforcement point transmits a request for a decision from the policy decision points, the method comprising the steps of:
   the policy enforcement point requesting decisions from the plurality of policy decision points through a policy strategy point in response to occurrence of an event;
   each of the plurality of policy decision points generating a decision by evaluating the event against a policy that corresponds to the policy decision point and that is relevant to the event;
   configuring a policy strategy point with a decision strategy that comprises an algorithm for determining a resulting decision from the decisions generated by the policy decision points, based on the plurality of decisions received from the plurality of policy decision points;
   the policy strategy point generating the resulting decision by applying said decision strategy on said decisions; and
   the policy strategy point communicating the resulting decision to the policy enforcement point, the policy enforcement point executing the resulting decision.

2. The method according to claim 1, further comprising the step of the policy strategy point orchestrating a workflow of requesting decisions from the policy decision points.

3. The method according to claim 1, wherein said algorithm comprises an algorithm of the group including:
   determining as the resulting decision a decision that is generated by a majority of the policy decision points;
   determining as the resulting decision a decision that is generated by a weighted majority of the policy decision points;
   determining as the resulting decision a decision that has been assigned with the highest weight;
   determining as the resulting decision a decision generated by a policy decision point having the highest priority according to a priority scheme, wherein each of the policy decision points has a priority assigned;
   determining as the resulting decision a decision that is generated by a first policy decision point of the policy decision points having put a veto on a decision of at least one other policy decision point of the policy decision points;
   determining as the resulting decision a decision that is, based on statistics, generated most frequently by the policy decision points
   determining as the resulting decision a first decision that is generated by a policy decision point; and
   determining as the resulting decision a decision of a further policy decision point, which is requested by the policy strategy point, if applying a decision strategy on the available decisions of multiple policy decision points does not result in a conclusive decision.

4. The method according to claim 3, comprising a hierarchy in selecting an algorithm.

5. The method according to claim 1, wherein the step of configuring a decision strategy comprises combining strategy elements out of a set of decision strategies.

6. The method according to claim 1, wherein the step of configuring a decision strategy comprises combining strategy elements out of a set of strategy elements into a decision strategy.

7. The method according to claim 1, wherein the step of applying said decision strategy on said decisions comprises resolving conflicting decisions from said decision points.

8. The method according to claim 1, wherein the step of the policy enforcement point transmitting a request for a decision, comprises directing said request to the policy strategy point.

9. The method according to claim 1, wherein the step of the policy enforcement point transmitting a request for a decision, comprises directing said request to the policy decision points, and further comprising the steps of the policy decision points directing said request to the policy strategy point.

10. The method according to claim 1, wherein the step of the policy enforcement point requesting decisions from policy decision points through the policy strategy point is performed in parallel or in sequence.

11. The method according to claim 2, wherein the orchestrated workflow is retrieved from a policy decision point.

12. The method according to claim 2, wherein the step of the policy strategy point orchestrating a workflow comprises requesting decisions of additional policy decision points based on the already acquired decisions.

13. The method according to claim 1, wherein the policy strategy point receives a policy from a Policy Repository.

14. A system for policy based management in a communication system comprising a policy enforcement point associated with a plurality of policy decision points, arranged for generating decisions, the policy enforcement point arranged to transmit a request for a decision from the policy decision points and for executing a resulting decision, the system comprising:
   a policy strategy point configured with a decision strategy comprising an algorithm for determining the resulting decision, based on the plurality of decisions received from the plurality of policy decision points;
   the policy enforcement point having means for requesting decisions from the plurality of policy decision points through the policy strategy point and the policy strategy point having means for receiving the decisions from the plurality of policy decision points;
   each of the policy decision points being configured to generate a decision by application of a policy corresponding to the policy decision point;
   the policy strategy point being arranged for generating the resulting decision, by applying said decision strategy on said decisions; and
   the policy strategy point arranged for communicating the resulting decision to the policy enforcement point.

15. The system according to claim 14, wherein the policy strategy point is interoperably connected to at least one of the policy decision points.

16. The system according to claim 14, wherein the policy strategy point is interoperably connected to the policy enforcement point.

17. The system according to claim 14, wherein the policy strategy point is interoperably connected to the policy enforcement point and to at least one of the policy decision points.

18. The system according to claim 14 further comprising a policy repository, arranged for providing a policy to the policy strategy point, said policy being relevant for a specific policy enforcement point (PEP), multiple PEPs, a specific policy decision point (PDP) and/or multiple PDPs.

19. The system according to claim 18, wherein said policy repository is arranged for providing a policy to the policy strategy point, said policy being relevant to the event upon which said policy is requested by the policy strategy point.

20. The system according to claim 18, wherein the policy repository is interoperably connected to the policy strategy point.

21. The method according to claim 1, wherein each of the policies that correspond to the plurality of policy decision points includes policy logic and policy data against which the event is evaluated.

* * * * *

UNITED STATES PATENT AND TRADEMARK OFFICE
CERTIFICATE OF CORRECTION

PATENT NO. : 8,606,738 B2
APPLICATION NO. : 11/910933
DATED : December 10, 2013
INVENTOR(S) : Van Elburg et al.

Page 1 of 1

It is certified that error appears in the above-identified patent and that said Letters Patent is hereby corrected as shown below:

In the Specification

In Column 1, Line 33, delete "'policy data," and insert -- 'policy data', --, therefor.

In Column 1, Line 45, delete "(P3p" and insert -- (P3P --, therefor.

In the Claims

In Column 7, Line 58, in Claim 3, delete "points" and insert -- points; --, therefor.

Signed and Sealed this
Fifth Day of August, 2014

Michelle K. Lee
*Deputy Director of the United States Patent and Trademark Office*